United States Patent [19]

Blom et al.

[11] Patent Number: 4,722,233

[45] Date of Patent: Feb. 2, 1988

[54] GYROSCOPIC DEVICE FOR GENERATING AN ANGLE CORRESPONDING TO MAGNETIC FLUX CHANGES

[75] Inventors: Rolf Blom; Leif-Anders Wallström, both of Karlskoga, Sweden

[73] Assignee: Aktiebolaget Bofors, Bofors, Sweden

[21] Appl. No.: 858,764

[22] Filed: May 2, 1986

[30] Foreign Application Priority Data

May 3, 1985 [SE] Sweden .................. 8502140

[51] Int. Cl.⁴ .................. G01C 19/28
[52] U.S. Cl. .................. 74/5.6 E; 73/505; 74/5.6 D
[58] Field of Search ........... 74/5.6 E, 5.6 R, 5.6 D; 33/1 N, 1 PT; 73/505; 324/208

[56] References Cited

U.S. PATENT DOCUMENTS

| | | | |
|---|---|---|---|
| 3,307,164 | 2/1967 | Zimmer | 324/208 X |
| 3,377,872 | 4/1968 | Hodson et al. | 74/5.6 E |
| 3,429,190 | 2/1969 | Dinter | 74/5.6 E |
| 3,509,779 | 5/1970 | Chappell | 74/5.6 E |
| 4,361,760 | 11/1982 | Rodgers | 74/5.6 A X |

FOREIGN PATENT DOCUMENTS 90813  7/1980  Japan .................. 74/5.6 E

Primary Examiner—Rodney H. Bonck
Attorney, Agent, or Firm—Pollock, Vande Sande & Priddy

[57] ABSTRACT

The disclosure relates to a gyroscope in which an electric signal corresponding to an angle $(-\alpha, +\alpha)$ between the rotor of the gyroscope and the frame of the rotor is generated. The rotor is provided with one or more permanent magnets. An element of magnetic material is disposed in the frame of the rotor so that the latter may move in relation to the element during its rotation. The element may be passed by the magnetic fields of the permanent magnets during rotation of the rotor so that magnetic flux changes occur in the element. The element is arranged such that the flux changes are dependent upon the above-mentioned angle and the flux changes are sensed by an electric induction winding which generates the electric signal.

8 Claims, 7 Drawing Figures

A—A

GYROSCOPIC DEVICE FOR GENERATING AN ANGLE CORRESPONDING TO MAGNETIC FLUX CHANGES

TECHNICAL FIELD

The present invention relates to a device for generating, in a gyroscope, an electric signal corresponding to an angle between the rotor of the gyroscope and its suspension means.

THE STATE OF THE ART

The present invention may be used in, for example, the type of gyroscope which comprises an outer rotational axis (the axis of rotation of the outer gimbal of the gyroscope) which is at right angles in relation to the inner rotational axis (the axis of rotation of the inner gimbal of the gyroscope), about which the rotor is journalled so that its axis of rotation extends at right angles to the inner axis of rotation.

The gyroscope is intended for employment in positional orientation in conjunction with the guidance and steering of ammunition spearheads, chassis units etc., the gyroscope being journalled in the body of the unit in question, by the intermediary of the outer axis of rotation.

It is previously known in the Art to read-off the angle of rotation between the above-mentioned outer axis of rotation and the body by means of a potentiometer.

In certain cases, it is also desirable to be able to read-off the angle of the inner axis of rotation (the rotor) in relation to the body. A slip ring (or collector ring) function can be employed to this end.

It is also previously known in the Art to employ optical and inductive read-off methods for sensing this angle.

BRIEF ACCOUNT OF THE PRESENT INVENTION

TECHNICAL PROBLEM

The use of potentiometers and slip-ring function in association with a gyroscope places strict demands on cleanliness in manufacture, storage and employment. On this point, it should be observed that the storage time involved is long and may extend over several years. Potentiometer which have been in lengthy service are manifestly sensitive to coatings, dirt and foreign matter on the electrical contact surfaces (platinum), a not inconsiderable inconvenience in this context. The requirement of reliable function placed on the gyroscope itself is also very high.

It is of crucial importance that the electric signal which is to indicate the angle in question be unambiguous and readily processable in signal processing equipment.

Optically operating devices proposed in this Art for sensing the angle of rotation of the rotor in relation to the body are complicated from both the manufacturing and operational points of view.

SOLUTION

The present invention has for its primary object to realize a device which obviates the above, and other, drawbacks and problems. In this context, that which may essentially be considered as characterizing the novel device according to the present invention is that the rotor is provided with one or more permanent magnets; that there is disposed, in the suspension means for the rotor, an element of magnetic material which is passable by the magnetic fields of the permanent magnets during rotation of the rotor, so that magnetic flux changes occur in the element; that the element is disposed such that the flux changes are dependent upon the above-mentioned angle; and that an electric induction winding senses the flux changes and, in dependence thereon, generates the electric signal.

In one embodiment of the present invention, the element is disposed at the outer axis of rotation of the gyroscope, the gyroscope being of the type in which the outer axis of rotation is disposed at right angle in relation to the inner axis of rotation, about which the rotor is journalled, so that its axis of rotation extends at right angle to the above-mentioned inner axis of rotation.

Preferably, the element displays a spherical portion tapering from the first axis. On rotation of the rotor, the permanent magnets pass under this spherical portion. The element is preferably substantially triangular in configuration in its projection to the horizontal section. Furthermore, the element is integral with or fixedly mounted in portions of a frame (gimbal) which carries the journalling of the rotor. At least these parts of the frame are of magnetic material. The element is suitably connected to a stub shaft which lies in the first axis and is also of magnetic material.

The above-mentioned induction winding is disposed in a recess in a unit utilizing the gyroscope and, in this instance, preferably concentrically about a stub shaft lying on the first axis of rotation. The element and the stub shaft may thereby form a common unit.

The electric signal which is obtained in the electric winding preferably comprises a pulse train, the interval between the pulses (the pulse periods) indicating the size of the angle in question. In such an instance, the element may be designed such that there is a linear relationship between the sizes of the above-mentioned angle and the relevant parameters of the electric signal. Naturally, it is possible to arrange the element such that a non-linear relationship is obtained.

ADVANTAGES

The present invention provides an extremely simple and reliable take-off principle for the establishment of the angle of rotation of the rotor about or on its journalling axis. As a result, the problem inherent in long storage life in the environment under consideration will be given its clear and explicit solution, requiring no slip-rings or collector rings.

Employed on, for example, an ammunition unit (ballistic missile), it will be possible to obtain, from one and the same gyroscope, exact angle readings of both the spinning and the tilting angles. In cases where the electric signal is obtained in the form of a pulse train in which the angle is represented by, for example, the pulse interval, the potential is created for a distinct and simple method of signal processing.

BRIEF DESCRIPTION OF THE ACCOMPANYING DRAWINGS

The nature of the present invention and its significant aspects will be more readily understood from the following brief description of the accompanying Drawings, and discussion of one proposed embodiment of a device according to the present invention relating thereto.

DESCRIPTION OF PREFERRED EMBODIMENT

Figure 1:
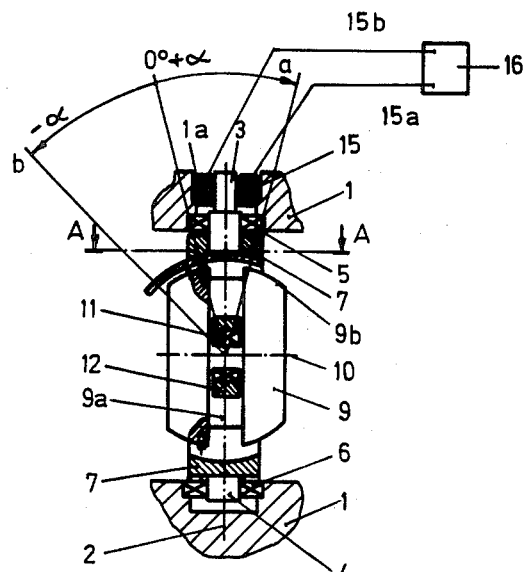
FIG. 1 shows, in vertical section, a gyroscope disposed in a body, for example an ammunition unit.

Referring to the Drawings, FIG. 1 shows a body 1 in which the gyroscope may be disposed. The body may consist of an ammunition unit, a vehicle chasis etc. The gyroscope displays a first rotational axis 2 represented in concrete form by stub shafts 3 and 4. The gyroscope is journalled in these stub shafts in the body by the intermediary of bearings 5 and 6 which may consist of per se known ball bearings. The stub shafts 3 and 4 are included in an outer gimbal together with a frame 7. This first, outer rotational axis 2 is disposed at right angles in relation to an inner rotational axis 8 about which the rotor 9 of the gyroscope is journalled. The inner rotational axis is disposed at right angle in relation to the rotational axis 10 of the rotor. In principle, the rotor is divided into two halves, with a peripheral bearing groove 9a. The halves of the rotor are each provided with their circular side surface, the side surfaces of the halves being substantially paralle. The end edges 9b of the above-mentioned halves are arcuate (spheroid). The rotor is journalled in two pairs of journal members 11 and 12; and 11' and 12', respectively. The latter being members consist of roller bearings which abut against the bottom surface of the annular groove 9a.

Figure 2:
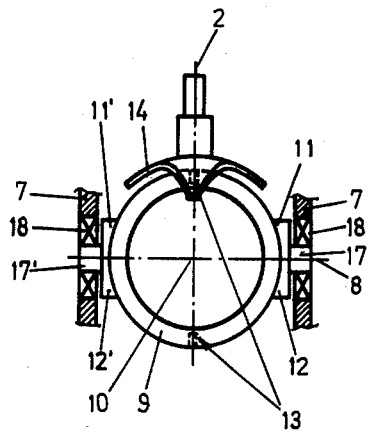
FIG. 2 shows, in vertical section turned through 90° in relation to FIG. 1, certain parts of the gyroscope of FIG. 1.

One or more bar magnets 13 are disposed in the one half 9' of the rotor. In the illustrated embodiment, two bar magnets are disposed in the one half of the rotor and are located diametrically opposite one another. Alternatively, the rotor may be provided with three or more bar magnets 13, uniformly distributed about the circumference, according to FIG. 2.

The gyroscope also includes an element 14 which is integral with or fixedly anchored in the frame 7 at the stub shaft 3. The element is of magnetic material. The frame 7, or at least those parts thereof which are located at the stub shaft 3, are also of magnetic material, this also applying to the stub shaft 3 proper.

Figure 3:
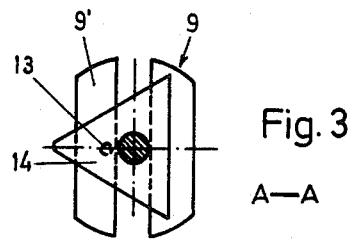
FIG. 3 shows, in horizontal section taken along the line A—A in FIG. 1, the gyroscope in question.

The element displays a spherical extent and has a horizontal section as shown in FIG. 3 which is substantially triangular in configuration. The element 14 displays a spherical form which adheres essentially to the form of the end surfaces 9b of the rotor halves.

At the stub shaft 3 and the ball bearing 5, the body 1 is recessed as indicated at 1a. An induction spool 15 is placed in this recess. Connection leads 15a and 15b are connected to converter means 16 for electric signals.

The gyroscope is, in a per se known manner, pivotal about the stub shaft 3 and the gyro rotor 9 in relation to its bearing axis 8. The bearing axis is represented in concrete form by two stub shafts 17 and 17' which are journalled in the frame 7 by the intermediary of ball bearings 18 and 18' of previously known type. The invention makes for the ready measurement of the angle of rotation between the rotor and the frame 7 are gimbal. A starting point is indicated by 0°. The gyroscope can then rotate from the starting point in a direction a, compare the angle $+\alpha$, and in a direction b, compare the angle $-\alpha$.

Figure 4:
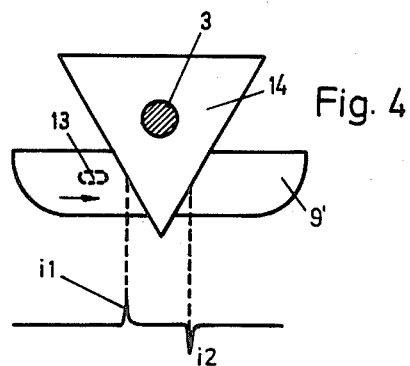
FIG. 4 is a horizontal view illustrating the functional principle of the gyroscope of FIGS. 1–3.

The take-off principle is apparent, inter alia from FIG. 4. When the gyroscope is activated (started) a high speed of rotation is imparted to the rotor. The two magnets 13 which are fixedly mounted on the rotor will, on their passage of the triangular-shaped take-off device (the element 14) effectuate a magnetic flux change, first on the passage of each respective magnet beneath the triangle, and secondly when the magnet in question passes out from beneath the triangle. This flux change is sensed in the induction winding which, in its turn, emits two electric impulses $i_1$ and $i_2$. Because of the form of the take-off device 14, the pulses are mutually counter-directed.

Figure 5:
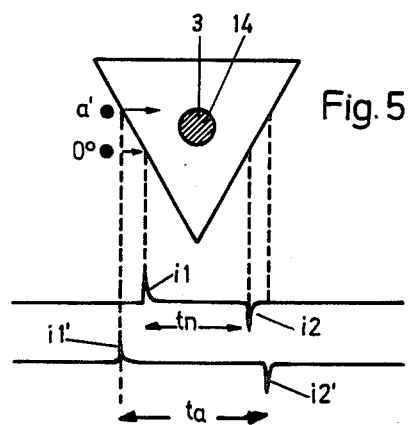
FIG. 5 is a horizontal view illustrating the functional principle in greater detail compared with FIG. 4.

By turning of the gimbal (the frame 7) in relation to the rotor, the magnets will pass at different points beneath the triangle. FIG. 5 shows the case in which the gimbal has moved towards the position a (see FIG. 1). A position a' is indicated on the Figure which also shows arrows where each respective magnet passes beneath the triangular element.

The mutual movement between the gimbal and the element 14 entails that the passage time t for each respective magnet will be prolonged. In the Figure, the pulse interval between the pulses $i_1$ and $i_2$ is designated $t_n$, which is the pulse interval at the starting point 0°. The prolonged passage time gives a larger pulse interval $t_a$ between the pulses $i_1$ and $i_2$. The above circumstance entails that $t_a > t_n$ when the gimbal system is turned in the direction a. Correspondingly, the passage time $t_b < tn$ if the system is turned in the direction b.

Figure 6:
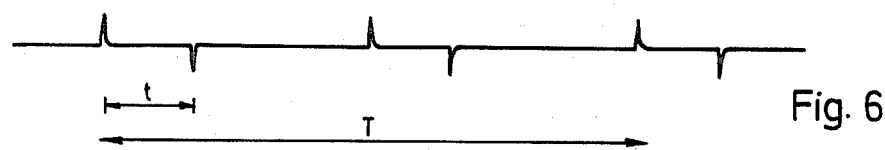
FIG. 6 shows an electric pulse train obtained from the gyroscope of FIGS. 1–3.
Figure 7:
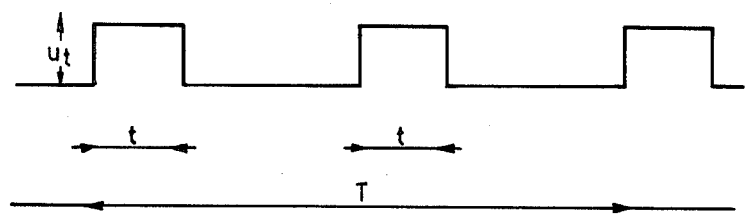
FIG. 7 shows square pulses extracted from the pulse train of FIG. 6.

Considering one complete revolution of the rotor, the pulse train according to FIG. 6 will be obtained. The rated speed of the rotor may vary from one start to another; and, moreover, the rotational speed is reduced as a function of time. However, these properties are of no significance. The reason for this is that if one assumes that the electric post-processing in the circuit 16 (see FIG. 1) converts the time t into a voltage pulse with the amplitude of $U_t$, and the length t, there will be obtained a pulse train according to FIG. 7, where the pulse relationship is the same.

If one further assumes that the voltage pulses $U_t$ are prolonged during the time T (the pulse may be considered as a surface with the magnitude $U_t \times t$), there will be obtained a new pulse with the amplitude of $U_T$ and the length T, which entails that the total surface is unchanged. This will, thus, give $U_t \times t + U_t \times t = U_T \times T$.

$$2U_t \times t = U_T \times T$$

$$U_T = U_t \times 2t/T$$

If $U_t$ is known, $U_T$ will consequently be obtained which, thus, is proportional to the quotient t/T. If the rotational speeds are different or the speed changes, this is of no consequence, since t and T change at the same percentage and may thus be reduced. In, for example, X% change, there will be obtained:

$$U_T = U_t \cdot \frac{2t\left(1 - \frac{x}{100}\right)}{T\left(1 - \frac{x}{100}\right)} = U_t \cdot \frac{2t}{T}$$

It will further be apparent that, since the time t changes as a function of the angle, U will also change as a function of the angle.

Because of the fact that the take-off device (the element 14) is substantially triangular, there will be obtained a linear relationship between angle and output voltage. If the take-off device is of a different design, for example non-triangular, non-linear relationships may be obtained between the output signal and the angle.

The signal processing circuit 16 (see FIG. 1) may be designed either using analog technique (low pass filter) or digital technique (microcomputers which can immediately execute the division t/T).

The present invention should not be considered as restricted to that described above and shown on the Drawings, many modifications being conceivable without departing from the spirit and scope of the appended Claims and the inventive concept as herein disclosed. For example, the rotor of the gyroscope may be provided with but a single permanent magnet and two take-off devices which, in such an instance, may be disposed each at their stub shaft 3 and 4, for the outer rotational axis. In such a case, two induction windings will be required.

What we claim and desire to secure by Letters Patent is:

1. In a gyroscope having a rotor and suspension means, a device for generating an electrical signal corresponding to an angle between the rotor and the suspension means, the device comprising:
   at least one permanent magnet associated with the rotor;
   a magnet element disposed in the suspension means, the element passable by the magnetic field of the permanent magnet during rotation of the rotor so that magnetic flux changes occur in the element, wherein the element is so disposed that the flux changes are dependent on the angle; and
   electric induction means for sensing the flux changes and generating the electrical signal in response thereto;
   wherein the element is disposed at an outer rotational axis of the gyroscope which is disposed at right angles to an inner rotational axis;
   wherein the rotor is journalled about the inner rotational axis such that its rotational axis extends at right angles to said inner rotational axis; and
   wherein the element displays a spherical portion tapering from the outer rotational axis, the permanent magnet passing under the portion during rotation of the rotor.

2. The device as claimed in claim 1 wherein the element has a substantially triangular horizontal claims.

3. The device as claimed in any one of claims 1 or 2, wherein the element is integrated or engaged with parts of said suspension means; the rotor journalling in said parts of said suspension means, at least said parts of said suspension means being magnetic.

4. The device as claimed in any one of claims 1 or 2 wherein the element is connected to a magnetic stub shaft included in the outer rotational axis.

5. The device as claimed in claim 4, wherein said induction means is concentrically disposed about said stub shaft.

6. The device as claimed in claim 5, wherein the elment and the stub shaft form a common unit.

7. The device as claimed in claim 1, wherein the element is so disposed that there is a linear relationship between the size of said angle and the electrical signal.

8. The device as claimed in claimed in claim 1, wherein the element is so disposed that there is a non-linear relationship between the size of said angle and said electrical signal.

* * * * *